Figure 1:
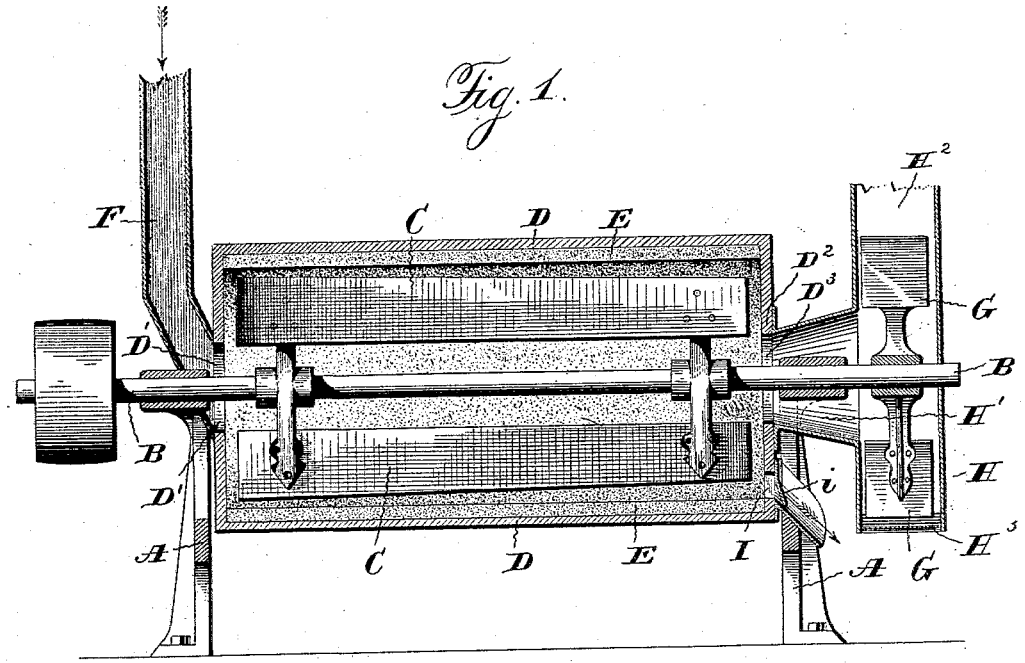

(No Model.)

J. J. FAULKNER.
COTTON SEED DELINTER.

No. 556,664. Patented Mar. 17, 1896.

Witnesses:
Jos. E. Hutchinson
Marie Wilson

Inventor:
J. J. Faulkner
By E. M. Marble & Sons
Atty's

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 556,664, dated March 17, 1896.

Application filed June 3, 1895. Serial No. 551,560. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter fully described and particularly pointed out in the claim.

In all cotton-seed delinters which have been hitherto constructed the abrading action upon the surfaces of the seed under treatment has taken place by reason of the fact that the seed is caused to assume a slow centrifugal movement over the face of the abrading-surfaces, one of which, at least, has a much more rapid movement and thus exerts a scouring action upon the seed. The seed, as regards the difference of speed between its rate of rotation and that of the revolving abrading-surface, may be considered as stationary. As this difference between the rate of speed of the revolution of the body of seed under treatment and that of the revolving abrading-surface measures the amount of abrading action which it is possible to obtain in any given machine, it will be seen that there is great loss of power in all of the present constructions, due to the fact that a large amount of power used to impart to the seed under treatment a centrifugal movement and to maintain the cylinder at the rate of speed at which the body of seed is moving is lost for the purposes for which the delinter is constructed.

The object of my present invention is to provide a machine in which the loss of power above called attention to will not be present and in which all of the power exerted to give the body of seed under treatment a centrifugal movement will have its direct results in effecting the scouring of the seed.

Attrition produced by the rubbing of seed against each other cannot be successfully relied upon to effect the delinting of the seed, because while machines can undoubtedly be devised for bringing the seed into contact with sufficient force to abrade the surfaces of the same the force exerted would necessarily be so great, on account of the small specific gravity of the seed, as to destroy the seed itself by the contact. While, therefore, I do not deem it expedient to effect the delinting of the seed by causing the same to strike against each other with sufficient force to produce an abrading action, I have succeeded in constructing a machine in which the principle of attrition is utilized.

I have constructed a casing whose inner surface is lined with a smooth abrading material, such as that formed by fine emery, and have provided means for feeding the seed into the casing, discharging said seed therefrom, and imparting a rapid centrifugal movement to the seed under treatment in the casing. The seed is compelled by this movement to hug the surface of the casing very closely as it rapidly revolves around the same, so that a scouring action is effected, and a face of the seed presented, even for a moment, to the action of the abrading-surface is scoured and cleansed from lint. The means used to impart a centrifugal motion to the seed is also so designed as to prevent the seed forming a solid unbroken roll around the abrading-surfaces. Instead of permitting the formation of such a roll it constantly breaks up the roll formed and thus causes new sides of the seed to be presented to the action of the abrading-surfaces, so that as the seed is discharged from the machine its surfaces are completely freed from any adhering lint. This construction can only be successful when the lining of the casing is very smooth, as any rings, projections or irregularities in the surface would cause the seed to cling so closely to that portion of the casing as to interrupt the delinting action of the entire machine and compel a shutting down of the machine until the fault in the abrading-surface has been removed. Feeding of the seed through the machine is not, however, difficult with a properly-constructed abrading-surface. For this purpose the constant feeding of the seed into the machine through the seed-inlet may be relied upon; but in the machine which I have herein illustrated I prefer to use additional feeding means. To this end I form the rotating blades, which are journaled upon a shaft extending centrally through the cylinder, extend longitudinally of the same, and produce the centrifugal motion of the seed under treatment, broader at the head end of the machine than at the discharge or tail end of the same, and, further, give to such blades a slight spiral inclination.

The distance between the edge of the rotating blades and the interior of the casing at the head end of the machine is preferably not more than five-eighths of an inch, and the distance between the edge of the rotating blades and the abrading-surface at the tail end of the machine is preferably not more than an inch and a half, but even the slight decrease of width toward the tail end of the machine thus given is sufficient to feed the seed through the machine, and may be relied upon independently of the spiral inclination of the blades. The spiral inclination of the blades is, however, of service in producing a forward spiral movement of the seed under treatment.

The removal of the lint separated by the action of the machine is effected by a central air-draft, which sweeps, in the construction shown, from end to end of the machine. The removal of lint thus effected is very complete, because the lint, by reason of its having a less specific gravity than the seed itself, will naturally remain on the inner surface of the roll formed by the seed in the machine, and will thus be readily subject to the influence of the central draft. The draft is caused by an exhaust-fan mounted in a suitable casing on the central power-shaft directly beyond the body of the machine and connected to the machine by a closed passage. The lint removed is discharged through an opening in the fan-casing; but in order to clean the lint from the fine dirt which is always present therewith as it is removed from a mass of seed I have provided an opening in the bottom of the fan-casing and supported in said opening a number of plates inclined with the motion of the fan. Dirt and other like impurities will drop through the openings thus constructed, while lint will not escape through the same. A separation of impurities from the lint is thus effected and the quality of the lint obtained much improved.

It is always advisable in treating cotton-seed to provide means for varying the length of treatment, as some classes of seed will be delinted more readily than others, and as the duration of the treatment in order to effect the best results depends, in a measure, upon the condition of the seed when it is subjected to the treatment. For this reason, therefore, I provide an inwardly-facing annular flange on the discharge end of the casing, so that when the valve which closes the discharge-opening is partially or entirely closed the seed may bank up in the machine and be subjected to a still further scouring action.

A machine constructed in the manner thus outlined possesses the advantages of marked simplicity in construction, durability in use and great capacity in handling seed. There is a still further advantage, however, which is no less important than that just mentioned—namely, the body of the seed under treatment is kept cool by the central air-draft, and thus injury to the seed through charring of the same avoided. Moreover, in a machine constructed in this manner there is no opportunity for excessive friction between the seed and any portion of the machine, so that loss of stock due to fire is most entirely avoided. A still further advantage lies in the fact that a glue composition can be used to hold the emery on the abrading-surface, which cannot be used in ordinary machines because of the heat caused in the same by the delinting of the seed.

My invention is fully illustrated in the drawings which accompany and form a part of this application, in which the same reference-letters refer to the same or corresponding parts, and in which—

Figure 2:
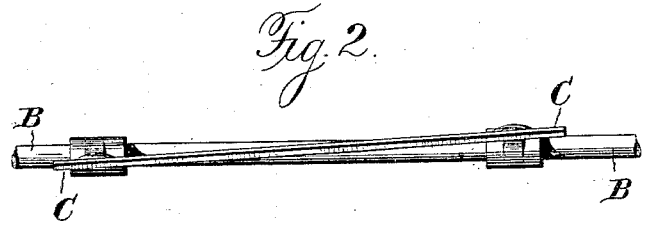
Figure 3:
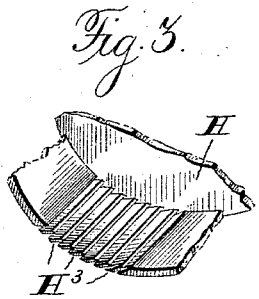

Figure 1 is a central section of my machine. Fig. 2 is a detail view of one of the rotating blades which produce the centrifugal motion of the seed. Fig. 3 is a detail perspective view showing the dirt-discharge openings in the casing for the exhaust-fan.

Referring to the drawings, A represents the machine-frame. In this frame is supported in suitable bearings the central shaft B, on which are mounted rotating blades C. These blades extend longitudinally of said shaft and operate within a casing D, whose inner face is lined with an abrading substance E.

The abrading-surface of the casing must be smooth in order to enable my machine to operate satisfactorily. I preferably form such surface of fine emery, held in place by glue.

Feeding of seed to the machine takes place through the feed-spout F, which is in connection with the central opening D' formed at the head end of the casing. Feeding of seed through the machine would take place simply through constant supply of seed from the feed-spout, but I preferably use positive means for insuring the passage of the seed through the machine, and in the present construction, with that end in view, make the rotating blades C wider at the head of the machine than at the tail or discharge end of the same. At the head end of the machine the distance between the outer edges of the blades and the surface of the casing is preferably only about five-eighths of an inch, while at the tail or discharge end of the machine such distance may be as great as an inch and a half. The result of thus forming the blades is to give to the seed a forward spiral movement. To accentuate this movement and to render its production certain, I further give to the blades a slight spiral inclination, as shown.

The seed-discharge takes place through a discharge-opening I, which is provided with a valve $i$ to control the movement of the discharge in accordance with the condition of the seed under treatment.

When the discharge of seed is restricted, however, it is necessary to provide means for allowing the seed to bank up in the machine. For this purpose I provide an inward flange $D^2$ at the discharge end of the machine, though such flange is not deep enough to close the opening $D^3$ at the discharge end of the machine through which removal of lint takes place.

The removal of the lint is effected by an exhaust-fan G, journaled on the central power-shaft in a suitable casing H, and connected with the opening formed in the discharge end of the delinter by a passage-way H'. When this fan is rapidly revolved a current of air is caused to sweep through the interior of the casing, which will attract and carry away the lint as rapidly as it is removed from the seed, owing to the fact that such lint lies on the interior of the roll formed by the seed. The lint-discharge takes place through an opening $H^2$ in the fan-casing. As there is always present with the lint as it is removed from the seed quite a large amount of fine dirt, however, and as the quality of the lint is much improved by effecting the removal from the same of any dirt or other impurities there present, I form an opening in the bottom of the fan-casing and support therein, at an inclination with the motion of the fan, inclined blades or slats $H^3$. When the fan is in operation, a slight inward air-draft will take place through such openings, but the draft will not be strong enough to prevent the falling therethrough of the dirt and impurities carried out of the casing by the air-current, caused by the action of the fan.

The operation of my machine is as follows: Seed is fed into the machine through the feed-spout F and is at once caused to assume a rapid centrifugal motion by the rotation of the blades C within the casing, due partly to the continual feeding of seed into the machine, partly to the decreasing width of the rotating blades C as they approach the tail or discharge end of the machine, and partly to the spiral inclination of such blades. The seed while rapidly revolving has imparted to it a forward spiral movement which causes it to sweep toward the discharge end of the casing and finally pass out through the discharge-opening I in quantities governed by the position of the valve $i$. The seed as it sweeps over the surface of the casing is rapidly scoured and freed from lint, it only requiring a momentary contact of any portion of the seed with the abrading-surfaces to effect a complete removal of the lint from such portion, so violent is the force with which the seed hugs the inner surface of the casing. As the surface of the casing is smooth, there is no tendency of the seed to hang at any portion of the same, but its forward spiral movement is continuous from one end of the machine to the other. The rotating blades C, which cause the movement of the seed, act to continually break up the roll of seed formed, so that new faces of the seed are constantly presented to the abrading-surface and a complete scouring or delinting of the seed effected before it is discharged. Removal of the lint takes place through a central opening formed in the discharge end of the casing by reason of the air-current caused by the exhaust-fan G. The lint removed escapes through the opening $H^2$ formed in the casing for the exhaust-fan, while the fine dirt escapes through the spaces between the inclined blades $H^3$.

Having fully described my invention, what I claim as new, and desire to secure by Letters Patent, is—

In a cotton-seed delinter, the combination with a casing lined with abrading material, a shaft extending through the same, and beater-arms mounted thereon, said beater-arms extending lengthwise of the machine and being placed with their outer edges at a distance from the casing which at the feed end of the machine does not much exceed the thickness of the roll of seed formed and which gradually increases as the discharge end of the machine is approached, of a seed-inlet opening, a discharge-opening, and means for producing a central air-current to remove the lint separated by the action of the machine, substantially as described.

In testimony whereof I affix my signature in presence of two witnesses.

JAMES J. FAULKNER.

Witnesses:
C. L. BERLIN,
JOHN HALLMER.